United States Patent
Kumazawa et al.

(10) Patent No.: US 9,623,757 B2
(45) Date of Patent: Apr. 18, 2017

(54) VEHICLE AND ELECTRIC POWER SUPPLY DEVICE FOR VEHICLE

(71) Applicant: Toyota Jidosha Kabushiki Kaisha, Toyota-shi, Aichi-ken (JP)

(72) Inventors: Suguru Kumazawa, Toyota (JP); Hideki Kamatani, Nagoya (JP); Ryoji Sato, Toyohashi (JP); Masaki Okamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/034,037

(22) PCT Filed: Nov. 5, 2014

(86) PCT No.: PCT/IB2014/002341
§ 371 (c)(1),
(2) Date: May 3, 2016

(87) PCT Pub. No.: WO2015/068016
PCT Pub. Date: May 14, 2015

(65) Prior Publication Data
US 2016/0288661 A1 Oct. 6, 2016

(30) Foreign Application Priority Data
Nov. 8, 2013 (JP) .................. 2013-232177

(51) Int. Cl.
*B60L 9/00* (2006.01)
*B60L 11/18* (2006.01)
(Continued)

(52) U.S. Cl.
CPC ............ *B60L 11/1814* (2013.01); *B60K 6/26* (2013.01); *B60K 6/365* (2013.01); *B60K 6/40* (2013.01);
(Continued)

(58) Field of Classification Search
CPC .. B60L 11/18; B60L 11/1814; B60L 11/1862; B60L 11/14
(Continued)

(56) References Cited

U.S. PATENT DOCUMENTS 8,907,647 B2 * 12/2014 Nakagawa ........ H02M 7/53871
323/222
2006/0055349 A1 3/2006 Nakayama et al.
(Continued)

FOREIGN PATENT DOCUMENTS

JP 2006-074932 A 3/2006
JP 2010-283932 A 12/2010
(Continued)

*Primary Examiner* — Thomas G Black
*Assistant Examiner* — Luke Huynh
(74) *Attorney, Agent, or Firm* — Dinsmore & Shohl LLP

(57) ABSTRACT

An electric power supply device for a vehicle includes an electric storage device, a boost converter, and a controller. The boost converter boosts voltage of the electric storage device and supplies the boosted voltage to an electric load of the vehicle. The controller controls the boost converter in a continuous boost mode and an intermittent boost mode. The continuous boost mode is a mode in which the boost converter is in continuous operation. The intermittent boost mode is a mode in which the boost converter is in intermittent operation. The controller more restricts a charge/discharge demand of the electric storage device such that a charge/discharge demand of the electric storage device at a time when the boost converter is operated in the intermittent boost mode is more restrictive than a charge/discharge demand of the electric storage device at a time when the boost converter is operated in the continuous boost mode.

6 Claims, 6 Drawing Sheets

(51) Int. Cl.
| | |
|---|---|
| B60L 7/14 | (2006.01) |
| B60L 11/12 | (2006.01) |
| B60L 11/14 | (2006.01) |
| B60L 15/00 | (2006.01) |
| B60L 15/20 | (2006.01) |
| H02M 3/156 | (2006.01) |
| B60W 20/14 | (2016.01) |
| B60K 6/26 | (2007.10) |
| B60K 6/365 | (2007.10) |
| B60K 6/40 | (2007.10) |
| B60K 6/44 | (2007.10) |
| B60L 7/10 | (2006.01) |
| H02M 3/04 | (2006.01) |
| H02M 3/157 | (2006.01) |
| H02M 1/00 | (2006.01) |

(52) U.S. Cl.
CPC ...... *B60K 6/44* (2013.01); *B60L 7/10* (2013.01); *B60L 7/14* (2013.01); *B60L 11/123* (2013.01); *B60L 11/14* (2013.01); *B60L 11/1861* (2013.01); *B60L 11/1864* (2013.01); *B60L 11/1877* (2013.01); *B60L 15/007* (2013.01); *B60L 15/2045* (2013.01); *B60W 20/14* (2016.01); *H02M 3/04* (2013.01); *H02M 3/156* (2013.01); *H02M 3/157* (2013.01); *B60L 2210/12* (2013.01); *B60L 2210/14* (2013.01); *B60L 2210/30* (2013.01); *B60L 2210/40* (2013.01); *B60L 2240/12* (2013.01); *B60L 2240/14* (2013.01); *B60L 2240/421* (2013.01); *B60L 2240/423* (2013.01); *B60L 2240/427* (2013.01); *B60L 2240/429* (2013.01); *B60L 2240/526* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2240/80* (2013.01); *B60L 2250/26* (2013.01); *B60L 2260/26* (2013.01); *B60L 2260/54* (2013.01); *B60L 2270/20* (2013.01); *B60Y 2200/92* (2013.01); *B60Y 2400/61* (2013.01); *H02M 2001/0035* (2013.01); *H02M 2001/0054* (2013.01); *Y02T 10/6217* (2013.01); *Y02T 10/645* (2013.01); *Y02T 10/7005* (2013.01); *Y02T 10/7044* (2013.01); *Y02T 10/7061* (2013.01); *Y02T 10/7077* (2013.01); *Y02T 10/7225* (2013.01); *Y02T 10/7233* (2013.01); *Y02T 10/7241* (2013.01); *Y02T 10/7283* (2013.01); *Y02T 10/92* (2013.01); *Y10S 903/906* (2013.01); *Y10S 903/91* (2013.01); *Y10S 903/93* (2013.01); *Y10S 903/951* (2013.01)

(58) Field of Classification Search
USPC ........ 701/22; 323/284, 222, 285; 180/65.23, 180/65.265; 903/903
See application file for complete search history.

(56) References Cited

U.S. PATENT DOCUMENTS

| | | | |
|---|---|---|---|
| 2012/0069613 A1 | 3/2012 | Nakagawa | |
| 2012/0089290 A1* | 4/2012 | Kato | B60K 6/445 701/22 |
| 2013/0013137 A1* | 1/2013 | Saint-Macary | B60K 6/442 701/22 |
| 2015/0191133 A1 | 7/2015 | Okamura et al. | |

FOREIGN PATENT DOCUMENTS

| | | | |
|---|---|---|---|
| JP | 2011-015603 A | | 1/2011 |
| JP | 2011-200056 A | | 10/2011 |
| JP | 2012-147538 A | | 8/2012 |
| JP | 2012147538 A | * | 8/2012 |
| WO | 2004/114511 A2 | | 12/2004 |
| WO | 2010/143511 A1 | | 12/2010 |
| WO | 2011/114443 A1 | | 9/2011 |
| WO | 2014/010028 A1 | | 1/2014 |

* cited by examiner

VEHICLE AND ELECTRIC POWER SUPPLY DEVICE FOR VEHICLE

BACKGROUND

1. Field

The disclosure relates to a vehicle and an electric power supply device for a vehicle.

2. Description of Related Art

Japanese Patent Application Publication No. 2011-015603 (JP 2011-015603 A) discloses a technique for correcting a torque command of an electric motor or an electric power generator so as to decrease deviation between command voltage and output voltage of a boost converter when the boost converter is stopped. With the technique, the output voltage of the boost converter can be maintained to be constant while the boost converter is stopped.

SUMMARY

It is conceivable to execute intermittent boost control for reducing electric power loss due to boost converter switching by operating and stopping the boost converter in an intermittent manner when current consumption in a motor generator is low. When a charge/discharge demand of an electric storage device increases while boosting is stopped during the intermittent boost control, divergence between the output voltage and the command voltage of the boost converter increases, and the boost converter resumes a boost operation. As a result, an electric power loss reduction effect by the intermittent boost control may be damaged.

An object of the disclosure is to provide a vehicle and an electric power supply device for a vehicle capable of preventing damage to an electric power loss reduction effect by intermittent boost control depending on a charge/discharge demand of an electric storage device.

According to an aspect of the disclosure, there is provided an electric power supply device for a vehicle including an electric storage device, a boost converter, and a controller. The boost converter boosts voltage of the electric storage device and supplies the boosted voltage to an electric load of the vehicle. The controller controls the boost converter in a continuous boost mode and an intermittent boost mode. The continuous boost mode is a mode in which the boost converter is in continuous operation. The intermittent boost mode is a mode in which the boost converter is in intermittent operation. The controller restricts a charge/discharge demand of the electric storage device such that a charge/discharge demand of the electric storage device at a time when the boost converter is operated in the intermittent boost mode is more restrictive than a charge/discharge demand of the electric storage device at a time when the boost converter is operated in the continuous boost mode.

According to this configuration, the charge/discharge demand of the electric storage device is restricted in the intermittent boost mode. Accordingly, boost resumption by the boost converter while boosting is stopped can be prevented. As a result, damage to an electric power loss reduction effect in the intermittent boost mode can be prevented.

In the above-described aspect, the controller may obtain the charge/discharge demand of the electric storage device based on power required for traveling of the vehicle. In addition, the controller may restrict the charge/discharge demand such that a range of the power required for the traveling of the vehicle in which the charge/discharge demand at a time when the boost converter is operated in the intermittent boost mode becomes zero is wider than a range of the power required for the traveling of the vehicle in which the charge/discharge demand at a time when the boost converter is operated in the continuous boost mode becomes zero.

According to this configuration, the charge/discharge demand becomes zero with respect to a wide range of the power required for the traveling when the boost converter is operated in the intermittent boost mode. Accordingly, damage to the electric power loss reduction effect can be prevented in a wide range of the power required for the traveling.

In the above-described aspect, the controller may obtain the charge/discharge demand of the electric storage device based on power required for traveling of the vehicle. In addition, the controller may restrict the charge/discharge demand such that the amount of change in the charge/discharge demand with respect to the power required for the traveling of the vehicle at a time when the boost converter is operated in the intermittent boost mode is smaller than the amount of change in the charge/discharge demand with respect to the power required for the traveling of the vehicle at a time when the boost converter is operated in the continuous boost mode when the power required for the traveling is within a predetermined range.

According to this configuration, damage to the electric power loss reduction effect can be prevented when the power required for the traveling is within a predetermined range during the operation of the boost converter in the intermittent boost mode.

In the above-described aspect, the controller may more restrict the charge/discharge demand such that the charge/discharge demand at the time when the boost converter is operated in the intermittent boost mode and the ratio of a period during which the boost converter is stopped in a predetermined period is equal to or higher than a predetermined value is more restrictive than the charge/discharge demand at the time when the boost converter is operated in the continuous boost mode.

Boost resumption by the boost converter is prevented by restricting the charge/discharge demand of the electric storage device when the boost converter is operated in the intermittent boost mode and the ratio of the period during which the boost converter stops boosting is high in a predetermined period. In this manner, damage to the electric power loss reduction effect can be prevented.

According to another aspect of the disclosure, a vehicle includes an electric load, a boost converter, and a controller. The boost converter boosts voltage of an electric storage device and supplies the boosted voltage to the electric load. The controller controls the boost converter in a continuous boost mode and an intermittent boost mode. The continuous boost mode is a mode in which the boost converter is in continuous operation. The intermittent boost mode is a mode in which the boost converter is in intermittent operation. The controller more restricts a charge/discharge demand of the electric storage device such that a charge/discharge demand of the electric storage device at a time when the boost converter is operated in the intermittent boost mode is more restrictive than a charge/discharge demand of the electric storage device at a time when the boost converter is operated in the continuous boost mode.

According to the disclosure, damage to the electric power loss reduction effect by intermittent boost control can be prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
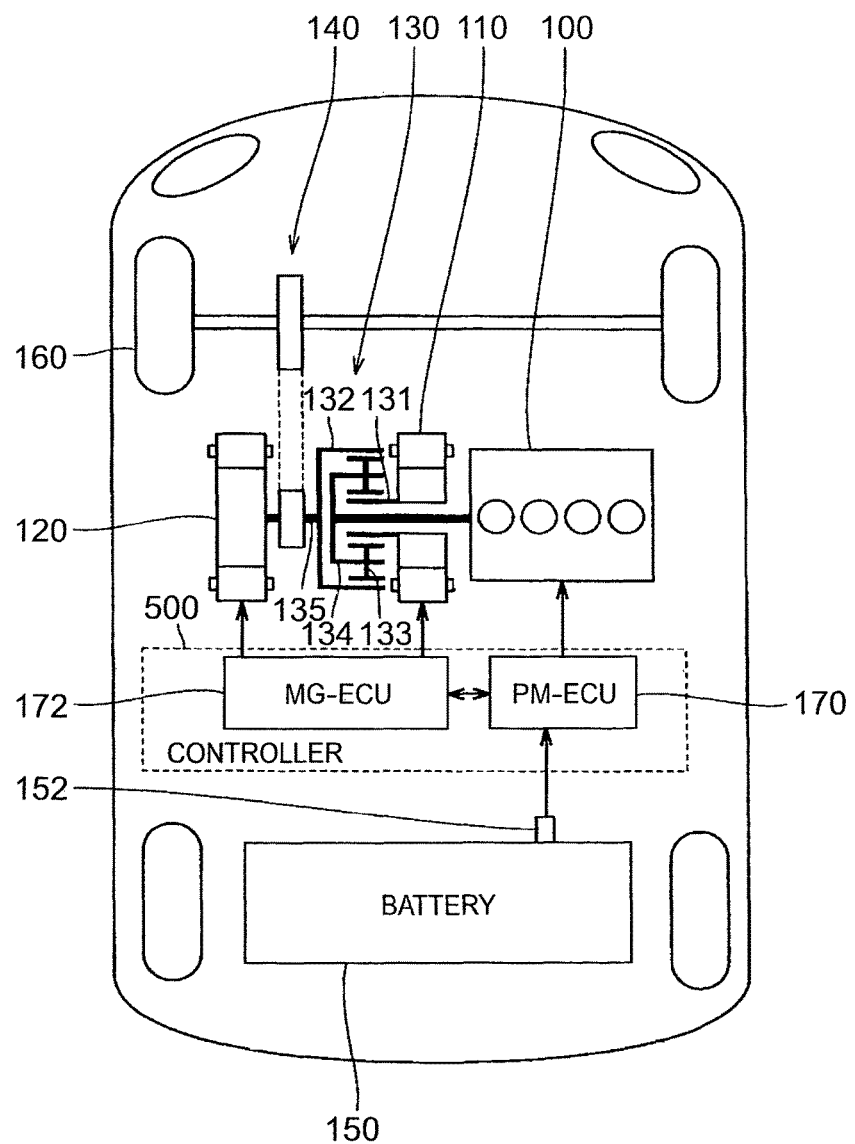
FIG. 1 is a block diagram showing a configuration example of a hybrid vehicle that is illustrated as a representative example of an electric vehicle according to an embodiment of the disclosure.

FIG. 1 is a block diagram showing a configuration example of a hybrid vehicle that is illustrated as a representative example of an electric vehicle according to an embodiment of the disclosure.

Referring to FIG. 1, the hybrid vehicle includes an engine 100 that corresponds to an "internal combustion engine", a first motor generator (MG) 110, a second MG 120, a power split mechanism 130, a decelerator 140, a battery 150, driving wheels 160, and a controller 500. The controller 500 has a power management (PM)-electronic control unit (ECU) 170 and a motor generator (MG)-ECU 172.

The hybrid vehicle travels by using a driving force from at least any one of the engine 100 and the second MG 120. The engine 100, the first MG 110, and the second MG 120 are connected via the power split mechanism 130.

The power split mechanism 130 is configured representatively as a planetary gear mechanism. The power split mechanism 130 includes an external sun gear 131, an internal ring gear 132 that is arranged concentrically with the sun gear 131, a plurality of pinion gears 133 that are engaged with the sun gear 131 and are engaged with the ring gear 132, and a carrier 134. The carrier 134 is configured to hold the plurality of pinion gears 133 in a rotatable and revolvable manner.

Power that is generated by the engine 100 is split into two paths by the power split mechanism 130. One is a path in which the driving wheels 160 are driven via the decelerator 140. The other is a path in which the first MG 110 is driven for electric power generation.

The first MG 110 and the second MG 120 are three-phase AC rotary electric machines configured representatively by using permanent magnet motors.

The first MG 110 is operated mainly as an "electric power generator", and can perform electric power generation by using the driving force from the engine 100 that is divided by the power split mechanism 130. Electric power that is generated by the first MG 110 is properly used in response to a traveling state of the vehicle and a state of charge (SOC) state of the battery 150. Then, the electric power is stored in the battery 150 after voltage of the electric power is adjusted by a converter (described later). During motoring of the engine 100 in engine start-up and the like, the first MG 110 can also be operated as an electric motor as a result of torque control.

The second MG 120 is operated mainly as an "electric motor", and is driven by at least any one of the electric power that is stored in the battery 150 or the electric power that is generated by the first MG 110. Power that is generated by the second MG 120 is transmitted to not only a driving shaft 135 but also the driving wheels 160 via the decelerator 140. In this manner, the second MG 120 assists the engine 100 or allows the vehicle to travel by using the driving force from the second MG 120.

During regenerative braking of the hybrid vehicle, the second MG 120 is driven by the driving wheels 160 via the decelerator 140. In this case, the second MG 120 is operated as an electric power generator. In this manner, the second MG 120 functions as a regenerative brake that converts braking energy to electric power. The electric power that is generated by the second MG 120 is stored in the battery 150.

The battery 150 is a battery pack that is configured to have a plurality of battery modules, in which a plurality of battery cells are integrated, connected in series. Voltage of the battery 150 is, for example, approximately 200 V. The battery 150 can be charged with the electric power that is generated by the first MG 110 or the second MG 120. The temperature, voltage, and current of the battery 150 are detected by a battery sensor 152. The battery sensor 152 is a comprehensive designation of a temperature sensor, a voltage sensor, and a current sensor.

The PM-ECU 170 and the MG-ECU 172 are configured to have a built-in central processing unit (CPU, not illustrated) and a built-in memory, and are configured to execute arithmetic processing based on a value detected by each of the sensors by software processing according to a map and a program stored in the memory. Alternatively, at least a part of the PM-ECU 170 or the MG-ECU 172 may be configured to execute predetermined arithmetic operation processing and/or logical operation processing by hardware processing by a dedicated electronic circuit or the like.

The engine 100 is controlled according to an operation command value from the PM-ECU 170. The first MG 110, the second MG 120, a converter 200, and inverters 210, 220 are controlled by the MG-ECU 172. The PM-ECU 170 and the MG-ECU 172 are connected to be capable of bidirectional communication.

In this embodiment, the PM-ECU 170 and the MG-ECU 172 are configured as separate ECUs. However, a single ECU that has functions of both the PM-ECU 170 and the MG-ECU 172 may be disposed.

Figure 2:
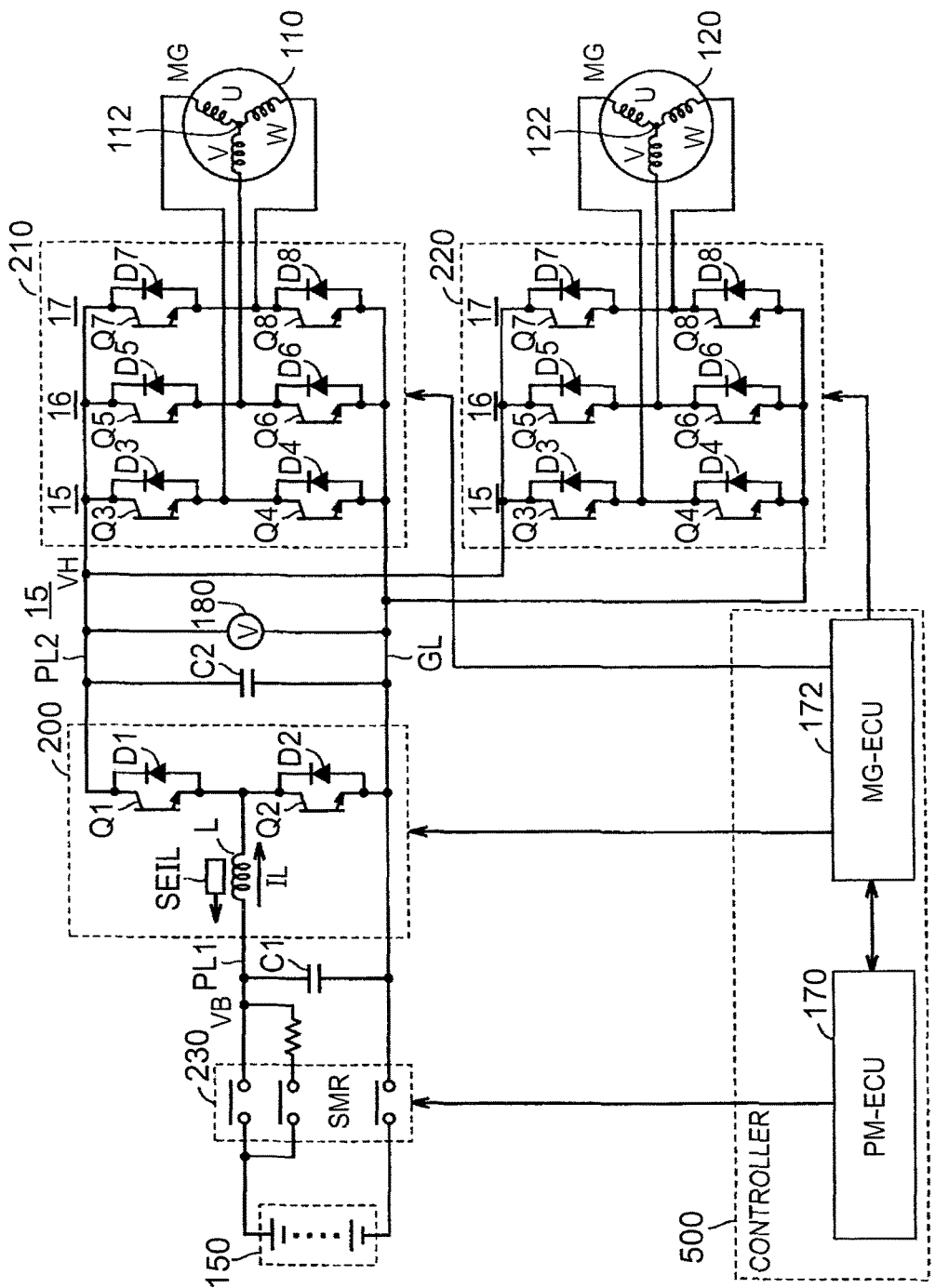
FIG. 2 is a diagram showing an electrical system of the hybrid vehicle.

FIG. 2 is a circuit diagram showing a configuration example of an electrical system of the hybrid vehicle that is illustrated in FIG. 1.

Referring to FIG. 2, the converter 200, the inverter 210 that corresponds to the first MG 110, the inverter 220 that corresponds to the second MG 120, a system main relay (SMR) 230, and capacitors C1, C2 are disposed in the electrical system of the hybrid vehicle.

The converter 200 includes two serially-connected power semiconductor switching elements Q1, Q2 (hereinafter, simply referred to as "switching elements" in some cases), diodes D1, D2 that are disposed to correspond to the respective switching elements Q1, Q2, and a reactor L.

The switching elements Q1, Q2 are connected in series between a positive line PL2 and a grounding line GL that is connected to a negative electrode of the battery 150. A collector of the switching element Q1 is connected to the positive line PL2, and an emitter of the switching element Q2 is connected to the grounding line GL. The diodes D1, D2 are anti-parallelly connected to the respective switching elements Q1, Q2. The switching element Q1 and the diode D1 constitute an upper arm of the converter 200, and the switching element Q2 and the diode D2 constitute a lower arm of the converter 200.

An insulated gate bipolar transistor (IGBT), a power metal oxide semiconductor (MOS) transistor, a power bipolar transistor, and the like can be employed as appropriate as the power semiconductor switching elements Q1, Q2. ON/OFF of each of the switching elements Q1, Q2 is controlled by a switching control signal from the MG-ECU 172.

One end of the reactor L is connected to a positive line PL1 that is connected to a positive electrode of the battery 150, and the other end of the reactor L is connected to a connection node of the switching elements Q1, Q2, that is, a connection point between an emitter of the switching element Q1 and a collector of the switching element Q2.

The capacitor C2 is connected between the positive line PL2 and the grounding line GL. The capacitor C2 smoothens an alternative current component of voltage fluctuation between the positive line PL2 and the grounding line GL. The capacitor C1 is connected between the positive line PL1 and the grounding line GL. The capacitor C1 smoothens an alternative current component of voltage fluctuation between the positive line PL1 and the grounding line GL.

An electric current IL that flows in the reactor L (hereinafter, referred to as the reactor current) is detected by a current sensor SEIL. A voltage sensor 180 detects interterminal voltage of the capacitor C2 that is output voltage of the converter 200, that is, voltage VH (system voltage or voltage of a driving voltage system) between the positive line PL2 and the grounding line GL, and outputs the detected value to the MG-ECU 172.

The converter 200 is electrically connected to the inverter 210 and the inverter 220 via the positive line PL2 and the grounding line GL.

During a boost operation, the converter 200 boosts direct current voltage VB (voltage at both ends of the capacitor C1) that is supplied from the battery 150, and supplies the boosted system voltage VH to the inverters 210, 220. More specifically, an ON period of the switching element Q1 and an ON period of the switching element Q2 are alternately provided in response to the switching control signal from the MG-ECU 172, and a boost ratio corresponds to the ratio between the ON periods.

During a step-down operation, the converter 200 steps down the system voltage VH that is supplied from the inverters 210, 220 via the capacitor C2, and charges the battery 150. More specifically, a period when only the switching element Q1 is ON and a period when both of the switching elements Q1, Q2 are OFF are alternately provided in response to the switching control signal from the MG-ECU 172, and a step-down ratio corresponds to a duty ratio of the ON period.

When the boosting and step-down by the converter 200 is stopped, the switching element Q1 is set ON-fixed and the switching element Q2 is set OFF-fixed.

The inverter 210 is configured as a general three-phase inverter, and has a U-phase arm 15, a V-phase arm 16, and a W-phase arm 17. The arms 15 to 17 include switching elements Q3 to Q8 and anti-parallel diodes D3 to D8.

When the vehicle travels, the inverter 210 controls the current or voltage of each phase coil of the first MG 110 so that the first MG 110 is operated according to an operation command value (representatively a torque command value) that is set to generate a driving force (vehicle driving torque, electric power generation torque, and the like) which is required for the traveling of the vehicle. In other words, the inverter 210 executes bidirectional DC/AC electric power conversion between the positive line PL2 and the first MG 110.

The inverter 220 is configured as a general three-phase inverter as is the case with the inverter 210. When the vehicle travels, the inverter 220 controls the current or voltage of each phase coil of the second MG 120 so that the second MG 120 is operated according to an operation command value (representatively a torque command value) that is set to generate a driving force (vehicle driving torque, regenerative braking torque, and the like) which is required for the traveling of the vehicle. In other words, the inverter 220 executes bidirectional DC/AC electric power conversion between the positive line PL2 and the second MG 120.

The PM-ECU 170 computes a torque command value TR1 of the first MG 110 and a torque command value TR2 of the second MG 120 based on an accelerator opening Acc and a vehicle speed V of the hybrid vehicle.

The MG-ECU 172 computes an optimum value (target value) of the output voltage (system voltage) VH of the converter 200, that is, command voltage VH*, based on the torque command value TR1 of the first MG 110, the torque command value TR2 of the second MG 120, the number of motor revolutions MRN1 of the first MG 110, and the number of motor revolutions MRN2 of the second MG 120 computed by the PM-ECU 170. The MG-ECU 172 calculates a duty ratio and controls the converter 200 so as to control the output voltage VH to the command voltage VH* based on the output voltage VH of the converter 200 detected by the voltage sensor 180 and the command voltage VH*.

The MG-ECU 172 controls the converter 200 with the converter 200 set in a continuous boost mode or an intermittent boost mode. The continuous boost mode is a mode in which the converter 200 does not stop executing the boost operation. The intermittent boost mode is a mode in which the converter 200 intermittently repeats the boost operation and stopping of the boost operation. When the converter 200 executes the boost operation, ON/OFF of the switching elements Q1, Q2 is switched. When the converter 200 stops the boost operation, the switching element Q1 is set ON-fixed and the switching element Q2 is set OFF-fixed.

Difference between when no boosting is performed by the converter 200 in the continuous boost mode and when boosting is stopped by the converter 200 in the intermittent boost mode is as follows.

In the continuous boost mode, the voltage of the battery 150 is supplied to the inverters 210, 220 via the converter 200. Accordingly, when no boosting is performed by the converter 200 in the continuous boost mode, the voltage of the battery 150 is supplied to the inverters 210, 220 as it is, without being boosted, via the converter 200 (at a duty ratio of one).

When boosting is stopped by the converter 200 in the intermittent boost mode, the voltage of the battery 150 is not supplied to the inverters 210, 220 via the converter 200.

Figure 3:
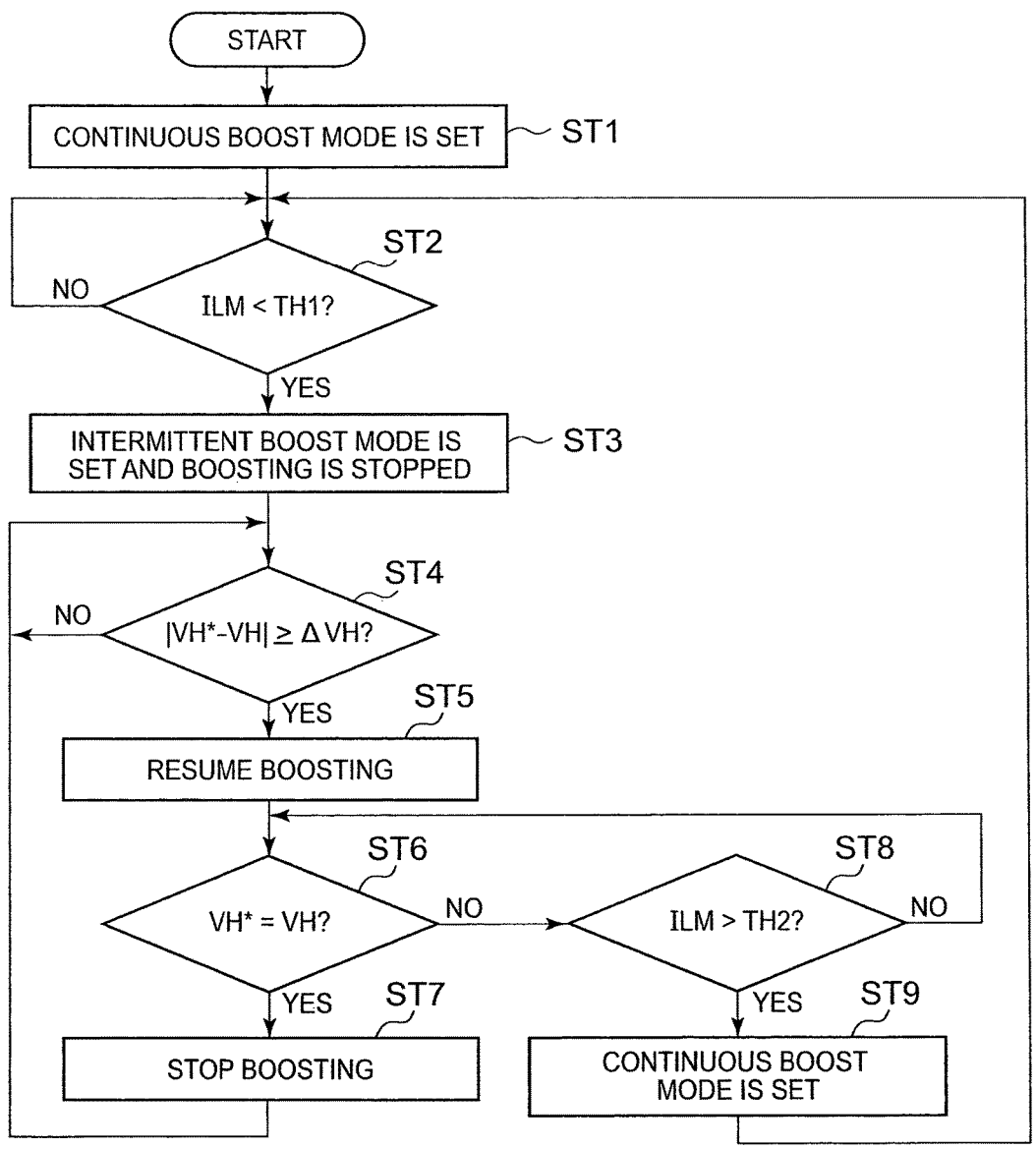
FIG. 3 is a flowchart showing a procedure of boost control by a converter.
Figure 4:
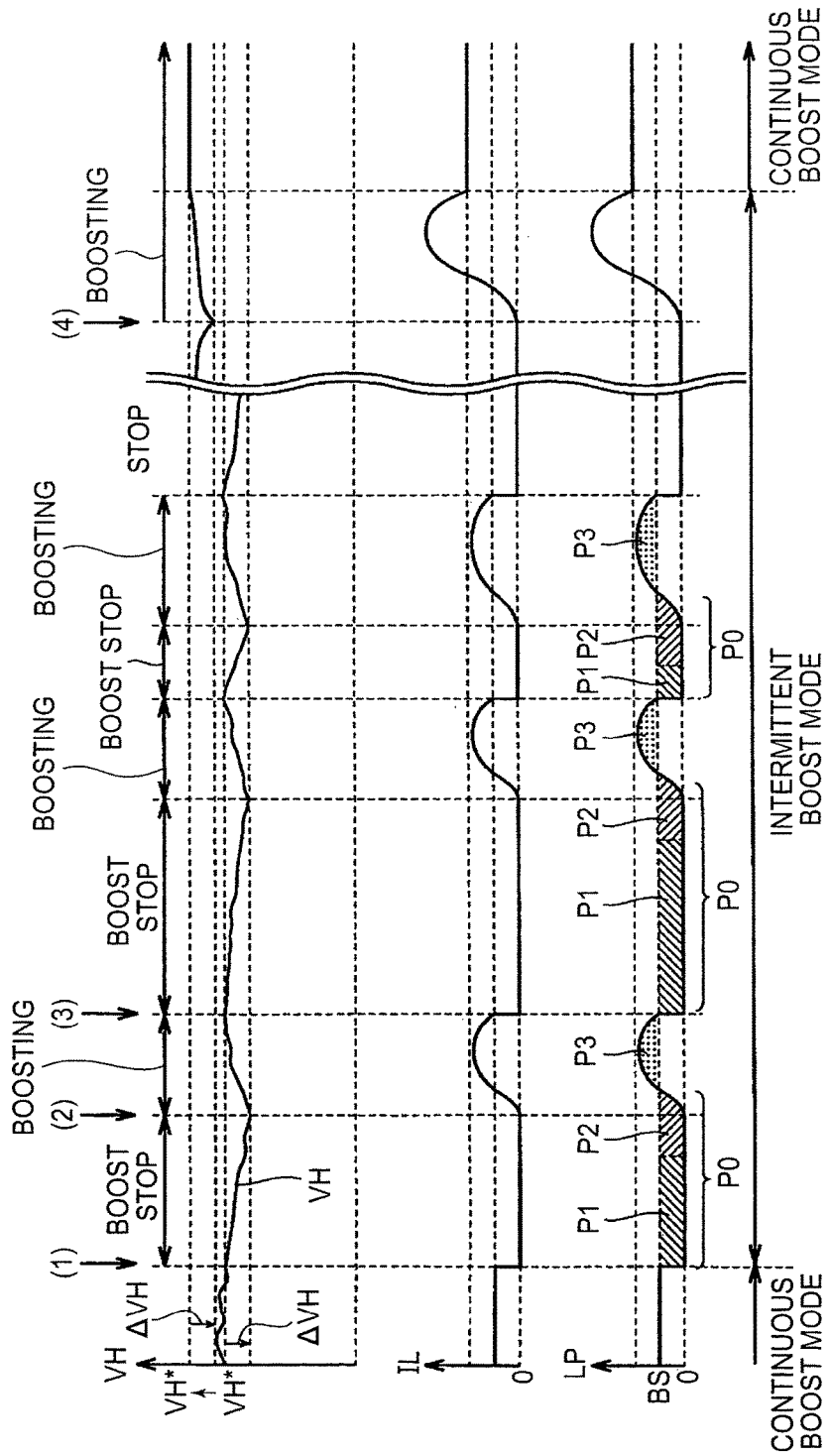
FIG. 4 is a diagram showing VH, IL, and LP in order from the top. The VH is output voltage (system voltage) of a converter 200 in a continuous boost mode and an intermittent boost mode. The IL is reactor current IL in the continuous boost mode and the intermittent boost mode. The LP is the amount of boost electric power loss LP by switching between the continuous boost mode and the intermittent boost mode.

FIG. 3 is a flowchart showing a procedure of boost control by the converter 200. FIG. 4 shows the VH, the IL, and LP in order from the top. The VH is the output voltage (system voltage) of the converter 200 in the continuous boost mode and the intermittent boost mode. The IL is a reactor current in the continuous boost mode and the intermittent boost mode. In reality, the reactor current IL fluctuates by switching of the converter 200. However, FIG. 4 illustrates a switching-based fluctuation component being smoothened. The LP is the amount of boost electric power loss by switching between the continuous boost mode and the intermittent boost mode.

Referring to FIGS. 2, 3, and 4, the controller 500 sets the converter 200 in the continuous boost mode in Step ST1. The converter 200 executes the boost operation without stopping the boost operation.

Then, the controller 500 allows the processing to proceed to Step ST3 if an average value ILM of the reactor current IL in a predetermined past period is lower than a threshold TH1 in Step ST2. In Step ST3, the controller 500 sets the converter 200 in the intermittent boost mode. In addition, the controller 500 stops the boost operation by the converter 200 (refer to, for example, moment (1) in FIG. 4).

When the boost operation of the converter 200 stops, no current is output from the battery 150, and thus the reactor current IL becomes zero and the amount of boost electric power loss LP becomes zero. When the boost operation of the converter 200 stops, the first MG 110 and/or the second MG 120 is driven by the electric power that is accumulated in the capacitor C2. Discharge of electric charges from the capacitor C2 causes the system voltage VH to decrease.

Then, the controller 500 allows the processing to proceed to Step ST5 when the amount of divergence |VH*-VH| between the system voltage VH and the command voltage VH* is equal to or greater than a restrict value ΔVH in Step ST4. In Step ST5, the controller 500 resumes the boost operation by the converter 200 (refer to, for example, moment (2) in FIG. 4).

When the boost operation of the converter 200 is resumed, the current (return current) that is required to drive the first MG 110 and/or the second MG 120 while charging the capacitor C2 is supplied from the battery 150. Accordingly, the reactor current IL increases and the amount of boost electric power loss LP increases.

Then, the controller 500 allows the processing to proceed to Step ST7 when the system voltage VH becomes equal to the command voltage VH* in Step ST6. In Step ST7, the controller 500 stops the boost operation by the converter 200 (refer to, for example, moment (3) in FIG. 4).

The controller 500 sets the converter 200 in the continuous boost mode if the average value ILM of the reactor current IL in the predetermined past period exceeds a threshold TH2 in step ST8. The converter 200 executes the boost operation without stopping the boost operation (refer to, for example, moment (4) in FIG. 4). It is illustrated in FIG. 4 that the command voltage VH* increases and the reactor current IL increases at moment (4).

FIG. 4 illustrates the amount of reduction in the amount of boost electric power loss LP when one boost stop period and the subsequent boost period in the intermittent boost mode are one set. The area P3 of a region between a line showing the amount of boost electric power loss LP above a reference electric power loss BS and a line showing the reference electric power loss BS shows the sum of the amount of boost electric power loss LP increased compared to the operation in the continuous boost mode. The area P0 of a region between a line showing the amount of boost electric power loss LP below the reference electric power loss BS and the line showing the reference electric power loss BS shows the sum of the amount of boost electric power loss decreased compared to the operation in the continuous boost mode. A value P1 that is obtained by subtracting P2 (=P3) from P0 is the sum of the amount of boost electric power loss that is reduced compared to the operation in the continuous boost mode due to the operation in the intermittent boost mode in the one set of the boost stop period and the subsequent boost period.

As illustrated in FIG. 4, the amount of boost electric power loss can be decreased when the intermittent boost mode is set. The longer the boost stop period, the greater a loss reduction effect.

Figure 5:
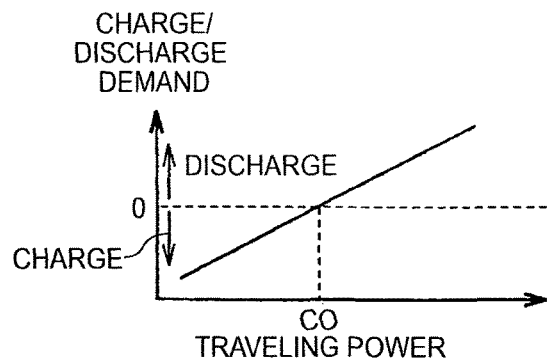
FIG. 5 is a diagram showing an example of a first map.

Next, a method for obtaining a charge/discharge demand of the battery 150 will be described. FIG. 5 is a diagram showing an example of a first map.

The charge/discharge demand is positive when a discharge request is present, and the charge/discharge demand is negative when a charge request is present.

In the first map, the charge/discharge demand (discharge request amount) increases from a control center CO as traveling power, which is power required for traveling, increases. The charge/discharge demand decreases (the charge request amount increases) from the control center CO as the traveling power decreases. The amount of change in the charge/discharge demand with respect to the traveling power is a constant value K.

Figure 6:
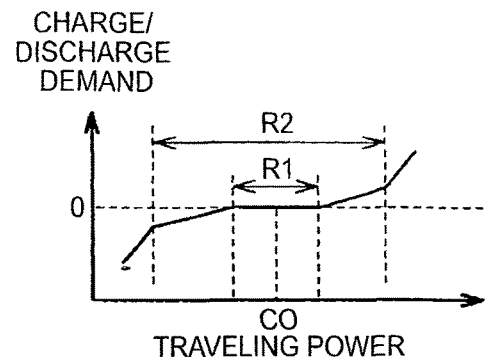
FIG. 6 is a diagram showing an example of a second map.

FIG. 6 is a diagram showing an example of a second map. In the second map, the charge/discharge demand is zero in the traveling power within a constant range R1 including the control center CO. In a region where the traveling power is greater than in the constant range R1, the charge/discharge demand (discharge request amount) increases as the traveling power increases. In a region where the traveling power is smaller than in the constant range R1, the charge/discharge demand decreases (charge request amount increases) as the traveling power decreases. The amount of change in the charge/discharge demand with respect to the traveling power in a constant range R2 including the control center CO is smaller than the constant value K in the first map. However, R2 is a range including R1, and the amount of change in the charge/discharge demand with respect to the traveling power in R1 is zero.

The MG-ECU 172 sets a flag sent to the PM-ECU 170 ON when the present state of the hybrid vehicle is in the intermittent boost mode and the ratio of the length of the boost stop period in a predetermined most recent period (for example, from seconds before the present moment to the present moment) is equal to or higher than a predetermined value TH. The MG-ECU 172 sets the flag sent to the PM-ECU 170 OFF when the present state of the hybrid vehicle is in the continuous boost mode, or the present state of the hybrid vehicle is in the intermittent boost mode and the ratio of the length of the boost stop period in a predetermined most recent period is lower than the predetermined value TH.

Figure 7:
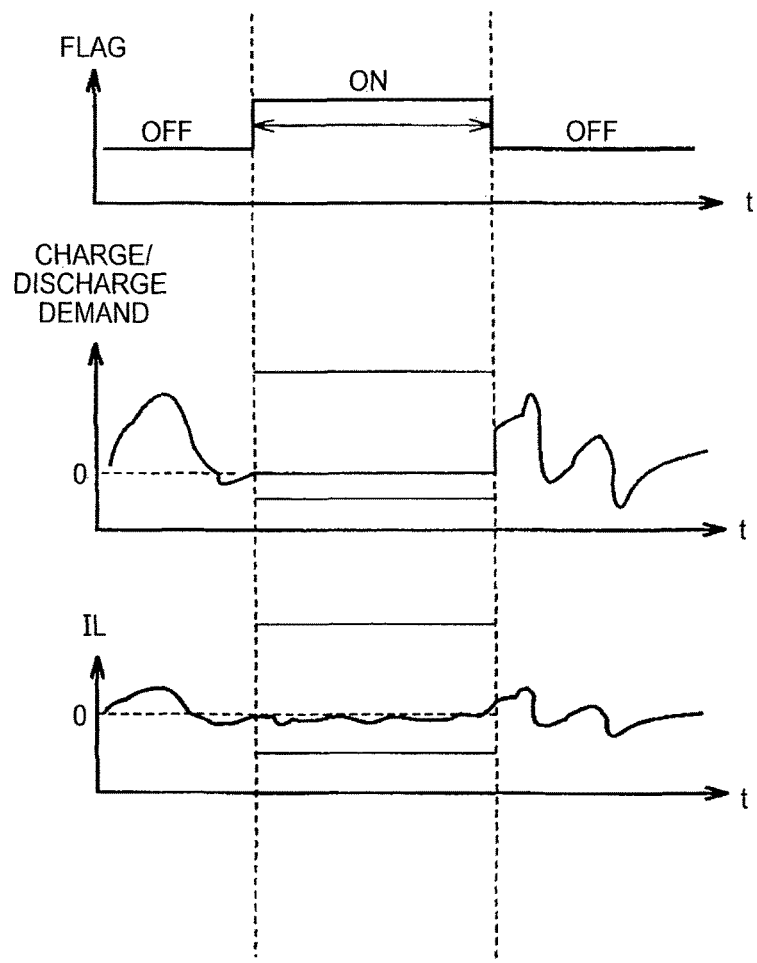
FIG. 7 is a diagram showing relationship of a flag, a charge/discharge demand, and the reactor current IL in order from the top.

FIG. 7 is a diagram showing relationship of the flag transmitted by the MG-ECU 172, the charge/discharge demand, and the reactor current IL. FIG. 7 illustrates the flag, FIG. 7 illustrates the charge/discharge demand, and FIG. 7 illustrates the reactor current IL. In reality, the reactor current IL fluctuates by switching of the converter 200. However, FIG. 7 illustrates a switching-based fluctuation component being smoothened.

The PM-ECU 170 obtains the charge/discharge demand corresponding to the traveling power according to the first map when the flag sent from the MG-ECU 172 is OFF. When the charge/discharge demand is not zero, a current is input into or output from the battery 150, and thus the reactor current IL does not become zero.

The PM-ECU 170 obtains the charge/discharge demand with respect to the traveling power according to the second map when the flag sent from the MG-ECU 172 is ON. In this case, the charge/discharge demand becomes zero if the traveling power in the second map is in the range of R1. In the second map, the reactor current IL becomes zero when the charge/discharge demand becomes zero because no current is output from the battery 150 and no current is input into the battery 150.

Figure 8:
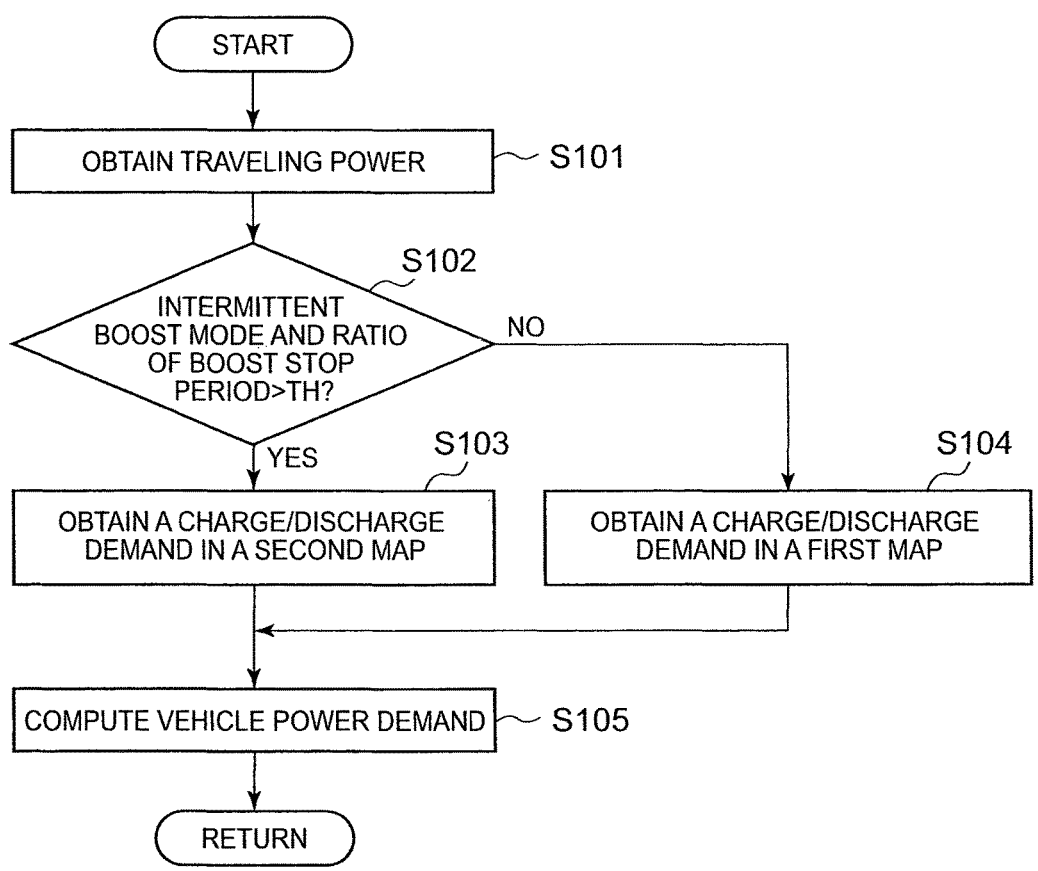
FIG. 8 is a flowchart illustrating a procedure of traveling control according to the embodiment of the disclosure.

Control of the traveling of the electric vehicle according to the embodiment of the disclosure will be described in detail below. FIG. 8 is a flowchart illustrating a procedure of the traveling control according to the embodiment of the disclosure. The control processing according to the flowchart illustrated in FIG. 8 is executed at a predetermined control cycle by, for example, the PM-ECU 170 and the MG-ECU 172 illustrated in FIG. 1.

Referring to FIG. 8, a map (not illustrated), in which relationship between the accelerator opening Acc and the vehicle speed V of the hybrid vehicle, and traveling power Tp* is predetermined, is stored in the memory by the PM-ECU 170 in step S101. The PM-ECU 170 obtains the traveling power Tp* by referring to the map when the accelerator opening Acc and the vehicle speed V are detected.

The PM-ECU 170 allows the processing to proceed to Step S103 when the flag sent from the MG-ECU 172 is ON (that is, when the present state of the hybrid vehicle is in the intermittent boost mode and the ratio of the length of the boost stop period in a predetermined most recent period is equal to or higher than the predetermined value TH) in Step S102.

The PM-ECU 170 allows the processing to proceed to Step S104 when the flag sent from the MG-ECU 172 is OFF (that is, when the present state of the hybrid vehicle is in the continuous boost mode, or when the present state of the hybrid vehicle is in the intermittent boost mode and the ratio of the length of the boost stop period in a predetermined most recent period is lower than the predetermined value TH).

In Step S103, the PM-ECU 170 obtains a charge/discharge demand Pchg by using the second map.

In Step S104, the PM-ECU 170 obtains the charge/discharge demand Pchg by using the first map.

In Step S105, the PM-ECU 170 computes a vehicle power demand Pe by adding the traveling power Tp* to the charge/discharge demand Pchg. The PM-ECU 170 determines power distribution to maximize energy efficiency of the entire vehicle according to the vehicle power demand Pe. Output distribution of the engine 100 and the second MG 120 is determined in this manner.

The PM-ECU 170 obtains the charge/discharge demand Pchg based on the traveling power Tp* in Step S103 and Step S104. However, the obtained charge/discharge demand Pchg may be corrected based on the state of charge (SOC) of the battery 150. For example, the PM-ECU 170 may decrease the charge/discharge demand when the SOC of the battery 150 reaches a predetermined lower restrict value, and may increase the charge/discharge demand when the SOC of the battery 150 reaches a predetermined upper limit value.

According to this embodiment, the charge/discharge demand is restricted in the intermittent boost mode and when the ratio of the period during which boosting is stopped by the converter 200 in a predetermined most recent period is high because it is predicted that the ratio of the converter 200 being in a stopped state will be also high in the future. This is because the probability of boost resumption by the converter 200 increases and boost loss reduction in intermittent boost control becomes impossible when the charge/discharge demand increases in this state.

The disclosure is not limited to the above-described embodiment, and may include modification examples as follows.

According to this embodiment, the charge/discharge demand is restricted in the intermittent boost mode and when the ratio of the period during which boosting is stopped by the converter in a predetermined most recent period is high. However, the disclosure is not limited thereto. The charge/discharge demand may be more restricted in the intermittent boost mode than in the continuous boost mode without any other condition.

The continuous boost mode and the intermittent boost mode are provided in the embodiment of the disclosure. However, a continuous step-down mode and an intermittent step-down mode may be provided. In other words, the MG-ECU 172 sets the converter 200 in the continuous step-down mode or the intermittent step-down mode. The continuous step-down mode is a mode in which the converter 200 does not stop executing the step-down operation. The intermittent step-down mode is a mode in which the converter 200 intermittently repeats the step-down operation and stopping of the step-down operation. When the converter 200 executes the step-down operation, a period when only the switching element Q1 is ON and a period when both of the switching elements Q1, Q2 are OFF are alternately switched. When the converter 200 stops the step-down operation, the switching element Q1 is set ON-fixed and the switching element Q2 is set OFF-fixed.

When the converter 200 stops the step-down operation, the battery 150 is charged with the electric power that is accumulated in the capacitor C1. Accordingly, the voltage VB of the capacitor C1 decreases and the voltage VB differs from a voltage command VB* of the voltage VB. When the charge/discharge demand increases in this state, the probability of step-down resumption by the converter 200 increases and step-down loss reduction in intermittent step-down control becomes impossible, and thus the PM-ECU 170 more restricts the charge/discharge demand in the intermittent step-down mode than in the continuous step-down mode.

The charge/discharge demand may be changed as follows based on which one of the intermittent step-down mode and the continuous step-down mode is set as the charge/discharge demand is changed based on which one of the intermittent boost mode and the continuous boost mode is set.

An electric power supply device for a vehicle according to the disclosure includes an electric storage device, the converter that steps down the voltage of the driving voltage system and supplies the voltage to the electric storage device, and the controller that controls the converter into the continuous step-down mode in which the converter is continuously operated and the intermittent step-down mode in which the converter is intermittently operated. The controller more restricts a charge/discharge demand of the electric storage device in the intermittent step-down mode than in the continuous step-down mode.

According to this configuration, the charge/discharge demand of the electric storage device in the intermittent step-down mode is restricted, and thus step-down resumption by the converter can be prevented when step-down is stopped. As a result, damage to an electric power loss reduction effect in the intermittent step-down mode can be prevented.

The controller may obtain the charge/discharge demand based on the power required for the traveling. The controller allows the charge/discharge demand to become zero with respect to the power required for the traveling in a wider range in the intermittent step-down mode than in the continuous step-down mode.

According to this configuration, the charge/discharge demand becomes zero with respect to a wide range of power required for the traveling in the intermittent step-down mode, and thus damage to the electric power loss reduction effect can be prevented in a wide range of power required for the traveling.

The controller may obtain the charge/discharge demand based on the power required for the traveling. When the power required for the traveling is in a predetermined range in the intermittent step-down mode, the controller decreases the amount of change in the charge/discharge demand with respect to the power required for the traveling compared to the continuous step-down mode.

According to this configuration, damage to the electric power loss reduction effect can be prevented when the power required for the traveling is in a predetermined range in the intermittent step-down mode.

The controller may restrict more the charge/discharge demand in the intermittent step-down mode and when the ratio of the period during which the converter stops the step-down in a predetermined period is equal to or higher than a predetermined value than in the continuous step-down mode.

In the intermittent step-down mode and when the ratio of the period during which the converter stops the step-down in a predetermined period is high, the charge/discharge demand of the electric storage device is restricted, and thus step-down resumption by the converter and damage to the electric power loss reduction effect can be prevented.

According to the disclosure, damage to the electric power loss reduction effect by intermittent step-down control can be prevented. In the embodiment of the disclosure, the MG-ECU 172 sets the flag sent to the PM-ECU 170 ON when the present state of the hybrid vehicle is in the intermittent boost mode and the ratio of the length of the boost stop period in a predetermined most recent period (for example, seconds before the present moment to the present moment) is equal to or higher than the predetermined value TH. However, the disclosure is not limited thereto.

For example, the MG-ECU 172 may set the flag sent to the PM-ECU 170 ON when the present state of the hybrid vehicle is in the intermittent boost mode and the ratio of the length of the boost stop period in the preceding intermittent boost mode is equal to or higher than the predetermined value TH.

The MG-ECU 172 may set the flat sent to the PM-ECU 170 ON when the average value ILM of the reactor current IL in a predetermined past period is equal to or lower than a predetermined value.

The charge/discharge demand is computed based on the traveling power in the embodiment of the disclosure. However, the disclosure is not limited thereto. For example, the charge/discharge demand may be computed based on a required driving force or torque.

It should be noted that the embodiment disclosed herein is an example in any aspect and does not limit the present subject matter. The scope of the present subject matter is clarified not by the above description but by the scope of claims, and includes any modification within the significance and scope equivalent to the scope of the claims.

What is claimed is:

1. An electric power supply device for a vehicle, the electric power supply device comprising:
    an electric storage device;
    a boost converter configured to boost voltage of the electric storage device and supply the boosted voltage to an electric load of the vehicle; and
    a controller configured to
        control the boost converter in a continuous boost mode and an intermittent boost mode, the continuous boost mode being a mode in which the boost converter is in continuous operation and the intermittent boost mode being a mode in which the boost converter is in intermittent operation, and
        restrict a charge/discharge demand of the electric storage device such that a charge/discharge demand of the electric storage device at a time when the boost converter is operated in the intermittent boost mode is more restrictive than a charge/discharge demand of the electric storage device at a time when the boost converter is operated in the continuous boost mode, wherein
    the controller is configured to obtain the charge/discharge demand of the electric storage device based on power required for traveling of the vehicle, and
    the controller is configured to restrict the charge/discharge demand such that a range of the power required for the traveling of the vehicle in which the charge/discharge demand at a time when the boost converter is operated in the intermittent boost mode becomes zero is wider than a range of the power required for the traveling of the vehicle in which the charge/discharge demand at a time when the boost converter is operated in the continuous boost mode becomes zero.

2. The electric power supply device according to claim 1, wherein
    the controller is configured to resume boost operation when the boost operation of the boost converter stops in the intermittent boost mode and an absolute value between an output voltage of the boost converter and a command voltage of the boost converter is equal to or greater than a restrict value.

3. The electric power supply device according to claim 1, wherein
    the controller is configured to obtain the charge/discharge demand of the electric storage device based on power required for traveling of the vehicle, and
    the controller is configured to restrict the charge/discharge demand such that an amount of change in the charge/discharge demand with respect to the power required for the traveling of the vehicle at a time when the boost converter is operated in the intermittent boost mode is smaller than an amount of change in the charge/discharge demand with respect to the power required for the traveling of the vehicle at a time when the boost converter is operated in the continuous boost mode when the power required for the traveling is within a predetermined range.

4. The electric power supply device according to claim 1, wherein
    the controller is configured to restrict the charge/discharge demand such that the charge/discharge demand at the time when the boost converter is operated in the intermittent boost mode and a ratio of a period during which the boost converter is stopped in a predetermined period is equal to or higher than a predetermined value is more restrictive than the charge/discharge demand at the time when the boost converter is operated in the continuous boost mode.

5. A vehicle comprising:

an electric load;

a boost converter configured to boost voltage of an electric storage device and supply the boosted voltage to the electric load; and a controller configured to control the boost converter in a continuous boost mode and an intermittent boost mode, the continuous boost mode being a mode in which the boost converter is in continuous operation and the intermittent boost mode being a mode in which the boost converter is in intermittent operation, and restrict a charge/discharge demand of the electric storage device such that a charge/discharge demand of the electric storage device at a time when the boost converter is operated in the intermittent boost mode is more restrictive than a charge/discharge demand of the electric storage device at a time when the boost converter is operated in the continuous boost mode, wherein the controller is configured to obtain the charge/discharge demand of the electric storage device based on power required for traveling of the vehicle, and the controller is configured to restrict the charge/discharge demand such that a range of the power required for the traveling of the vehicle in which the charge/discharge demand at a time when the boost converter is operated in the intermittent boost mode becomes zero is wider than a range of the power required for the traveling of the vehicle in which the charge/discharge demand at a time when the boost converter is operated in the continuous boost mode becomes zero.

6. The vehicle according to claim 5, wherein the controller is configured to resume boost operation when the boost operation of the boost converter stops in the intermittent boost mode and an absolute value between an output voltage of the boost converter and a command voltage of the boost converter is equal to or greater than a restrict value.

* * * * *